United States Patent [19]

Tominaga et al.

[11] 3,853,801

[45] Dec. 10, 1974

[54] ELECTROPHORETIC COATING COMPOSITIONS

[75] Inventors: Akira Tominaga; Norio Nikaido, both of Hiratsuka, Japan

[73] Assignee: Kansai Paint Company Limited, Hyogo-ken, Japan

[22] Filed: July 31, 1972

[21] Appl. No.: 276,295

[30] Foreign Application Priority Data

Aug. 5, 1971  Japan.............................. 46-59443

[52] U.S. Cl............ 260/29.3, 260/19 UA, 260/845, 204/181
[51] Int. Cl............................................ C08g 51/24
[58] Field of Search.............. 260/29.3, 19 UA, 845; 204/181

[56] References Cited
UNITED STATES PATENTS

| | | | |
|---|---|---|---|
| 3,324,197 | 6/1967 | Schwarzer | 260/19 UA |
| 3,351,675 | 11/1967 | Gilchrist | 260/29.3 |
| 3,654,203 | 4/1972 | Daimer et al. | 260/19 UA |
| 3,658,736 | 4/1972 | Daimer et al. | 260/845 |
| 3,658,795 | 4/1972 | Daimer | 260/29.3 |

*Primary Examiner*—Lorenzo B. Hayes
*Attorney, Agent, or Firm*—Larson, Taylor and Hinds

[57] ABSTRACT

An electrophoretic coating composition comprises an aqueous medium and a resinous binder dispersed therein, said resinous binder being a mixture of a modified butadiene polymer neutralized with a base and a water-dispersible methylolated phenol resin, said modified butadiene polymer being prepared by reacting a mixture of 1,2-polybutadiene, 1,4-polybutadiene and unsaturated oil compound having an iodine value of at least 100 with at least one of a $\alpha,\beta$-unsaturated dibasic acids and anhydrides thereof.

11 Claims, No Drawings

ELECTROPHORETIC COATING COMPOSITIONS

This invention relates to an electrophoretic coating composition, more particularly to an improved electrophonetic coating composition containing a modified butadiene polymer as a binder.

It is known in the art to use a neutralized reaction product of 1,2-polybutadiene and $\alpha,\beta$-unsaturated dibasic acid as a binder for an electrophonetic coating composition. When such a composition is employed as a primer, a lustrous and smooth top-coat surface can be obtained by two-step-coating operations consisting or primer coating with the above composition by electrophonetic deposition and subsequent top-enamel coating. The coating method with the above two-step-coating operations is advantageous from industrial viewpoints as compared with the conventional method in which three-step-coating operations, i.e., primer coating, sealer coating and top-enamel coating, are required. However, such two-step-coating operations result in the production of coating having poor anticorrosive property, hence not practical sufficiently.

In order to improve the anticorrosive property of the coating it has been proposed to use phenol resin in combination with the above neutralized reaction product of 1,2-polybutadiene and $\alpha,\beta$-unsaturated dibasic acid as a binder. The use of phenol resin, however, results in the poor curing properties of the coating film and makes it difficult to obtain a glossy and smooth top-coat by the two-step-coating operations.

On object of the invention is accordingly to provide an electrophoretic coating composition capable of producing not only a glossy and smooth top-coat surface but also a coating having excellent anticorrosive coating by two-step-coating operations.

Another object of the invention is to provide an electrophoretic coating composition having various desirable properties, for example, excellent bath stability, throwing power and film curing property.

These and other objects and advantages of the invention will be apparent from the following description.

The electrophoretic coating composition of the invention comprises an aqueous medium and a resinous binder dispersed therein, said resinous binder being a mixture of a modified butadiene polymer neutralized with a base and a water-dispersible methylolated phenol resin, said modified butadiene polymer being prepared by reacting a starting mixture of 1,2-polybutadiene, 1,4-polybutadiene and unsaturated oil compound having an iodine value of at least 100 with at least one of $\alpha,\beta$-unsaturated dibasic acids and anhydrides thereof.

Throughout the specification and claims, by "water-dispersible" is meant "capable of being dissolved or dispersed in water."

According to the researches of the present inventors it has been found that with the electrophoretic coating composition containing said specific modified butadiene polymer in combination with a methylolated phenol resin as a binder, not only a glossy and smooth coating can be obtained by two-step-coating operations but also the coating thus obtained is excellent in anticorrosive property. These effects can be ensured when the present composition is applied to a non-treated steel plate as well as parkerlized steel plate. Moreover, the present composition has excellent bath stability and displays excellent throwing power and film curing property. These effects obtained by the present composition can not be achieved by a mere mixture of maleinized polybutadiene with maleinized unsaturated oil. In fact when a mixture of maleinized polybutadiene and maleinized unsaturated oil is used in place of the modified butadiene polymer in the present composition, it is impossible to obtain a glossy and smooth top-coat surface by two-step-coating operations. Moreover, the throwing power of such mixture is far lower than that of the present composition. This is presumably attributable to the fact that a copolymerization reaction of polybutadienes with unsaturated oil compounds occurs to produce a homogeneous substance in the course of the reaction with $\alpha,\beta$-unsaturated dibasic acid.

The 1,2-polybutadiene to be used in the invention includes 1,2-polybutadiene and 1,2-polybutadiene carboxylic acid having carboxyl groups at the both ends of the polymer chain. It is required that such 1,2-polybutadiene contain at least 70 percent of vinyl bond ($-CH=CH_2$) based on the total unsaturations and have a number average molecular weight of 500 to 5,000 and an iodine value of at least 350. If the amount of the vinyl bond contained therein is less than 70 percent, the coating obtained will be too soft and a glossy and smooth top-coat surface will not be produced with two-step-coating operations. On the other hand, if the number average molecular weight is less than 500, the coating obtained will be brittle. Conversely, the number average molecular weight over 5,000 results in gelation during the reaction with $\alpha,\beta$-unsaturated dibasic acid to give an undesired modified product which will impair the smoothness of the resultant coating film obtained by electrophorectic deposition. Moreover, the use of 1,2-polybutadiene having an iodine value of less than 350 results in the production of modified polymer having poor film-curing property. Preferably, 1,2-butadiene polymer to be used in the invention contains at least 80 percent of vinyl bond based on total unsaturations and has a number average molecular weight of 1,000 to 3,000 and an iodine value of at least 400.

The 1,4-polybutadiene to be used in the invention contains at least 90 percent of 1,4-bond based on total unsaturations and has a number average molecular weight of 500 to 10,000 and an iodine value of at least 400. The use of 1,4-polybutadiene containing less than 90 percent of 1,4-bond results in the poor curing property of the resulting coating film when the modified polybutadiene is used in combination with methylolated phenol resin. When the 1,4-polybutadiene having a number average molecular weight less than 500 or higher than 10,000 is employed, the same disadvantages as disclosed in relation to 1,2-polybutadiene will be encountered. Moreover, the use of the 1,4-polybutadiene having an iodine value of less than 400 results in the poor curing property of the resulting coating film. It is preferable in the invention to employ 1,4-polybutadiene containing at least 90 percent of 1,4-bond and having a number average molecular weight of 1,000 to 5,000 and an iodine value of at least 450.

In accordance with the present invention, 1,2-polybutadiene and 1,4-polybutadiene are mixed with an unsaturated oil compound to produce a starting mixture which is subjected to the reaction with an $\alpha,\beta$-unsaturated dibasic acid. The unsaturated oil compounds to be used in the invention are those having an iodine value of at least 100, preferably 120 to 200. Examples of the unsaturated oil compounds are (1) natural oils, such as linseed oil, soybean oil, dehydrated castor oil, tung oil, safflower oil, cotton seed oil, tall oil, fish oil, whale oil, etc.; (2) fatty acids of the above oils (1), such as linseed oil fatty acid, soybean oil fatty acid, dehydrated castor oil fatty acid, tung oil fatty acid, etc.; (3) esters of the above fatty acids (2) with polyhydric alcohols having 2 to 6 hydroxyl groups in the molecule, such as neopentyl glycol, trimethylol propane, pentaerythritol, sorbitol etc.; (4) esters of the above fatty acids (2) with epoxy resins having a number average molecular weight of 200 to 2,000, such as a reaction product of bisphenol A with epichlorohydrine, etc.; (5) esters of the above fatty acids (2) with polyol resins having a number average molecular weight of 200 to 2,000, such as a copolymer of styrene and allyl alcohol, a copolymer of styrene and methallyl alcohol, etc.; (6) modified oils prepared by treating the above natural oils (1) thermally or chemically, such as boiled oil, stand oil, styrenated oils, etc.; and (7) dimers of the fatty acids shown in (2). Of these unsaturated oil compounds, preferable are linseed oil, dehydrated castor oil, soybean oil, or an ester of the fatty acid obtained by reacting the acids with an epoxy resin produced by the reaction of bisphenol A with epichlorohydrine. These unsaturated oil compounds can be used alone or in admixture with one another.

In accordance with the method of the present invention the 1,2-polybutadiene, 1,4-polybutadiene and unsaturated oil compound are mixed to produce a starting mixture. In preparing the starting mixture it is preferable to mix 1,2-polybutadiene and 1,4-polytuadiene in a weight ratio of 3 to 9 : 7 to 1. If the ratio of 1,2-polybutadiene relative to 1,4-polybutadiene is less than 3 : 7 or more than 9 : 1 the film surface obtained by two-step-coating operations will be somewhat impaired. Particularly preferable weight ratio of the former and the latter is 5 to 8 : 5 to 2. Preferable amount of the unsaturated oil compound to be mixed with the polybutadiene mixture is in the range of 10 to 60 weight percent, based on the total weight of the unsaturated oil compound and the polybutadiene mixture. The use of the amount of more than 60 weight percent of the unsaturated oil compound will reduce the gloss and smoothness of the coating film obtained by two-step-coating operations, whereas the use of the amount of less than 10 weight percent thereof may increase the viscosity of the reaction product of the modified butadiene polymer with α,β-unsaturated dibasic acids. Thus preferable amount of the unsaturated oil compound is in the range of 30 to 50 weight percent, based on the total weight of the unsaturated oil compound and polybutadiene mixture.

In preparing the starting mixture a part of the unsaturated oil compound can be replaced with at least one of a petroleum resin having an iodine value of less than 300 and a number average molecular weight of 200 to 2,000, rosin and cumarone resin. Such resins can be used in an amount of not more than 400 weight parts, preferably not more than 100 weight parts, based on 100 weight parts of the unsaturated oil compound. Thus, when such resin is used together with the unsaturated oil compound, the resultant oil-component mixture is mixed with the polybutadiene mixture in an amount of 10 to 60 weight percent, based on the total weight of the oil-component mixture and polybutadiene mixture.

In the invention α,β-unsaturated dibasic acids and anhydrides thereof (hereinafter referred to as "unsaturated dibasic acid" or "dibasic acid") to be reacted with the above starting mixture, are, for example, maleic acid, maleic anhydride, fumaric acid, itaconic acid, itaconic anhydride and the like. These dibasic acids can be used singly or in admixture with one another. The amount of dibasic acid is in the range of 7 to 40 weight parts, preferably 10 to 25 weight parts, based on 100 weight parts of the starting mixture.

The reaction between the starting mixture and α,β-unsaturated dibasic acid can preferably be carried out by heating the resultant mixture of the reactants at a temperature of 140° to 260°C. Particularly, a reaction temperature of 170° to 230°C is preferable. The reaction ensures a high rate of reaction of the α,β-unsaturated dibasic acid and it is preferable to effect the reaction to such extent that the amount of the dibasic acid consumed in the reaction is at least 95 percent, more preferably at least 98 percent. Organic solvents, such as xylene, toluene, etc., can be added to the reaction system, as required. The amount thereof may be in the order of less than 10 weight percent, based on the total weight of the reactants. Further, antigelling agents, such as hydroquinone, butylated hydroxytoluene, or copper or its compounds, can be added to the reaction system, if necessary.

When α,β-unsaturated dibasic acid anhydride is used in the reaction, it is preferable in the invention that the resultant reaction product is subjected to ring-opening reaction of the anhydride groups contained therein. The degree of ring-opening reaction is preferably more than 40%, which is evaluated by the following equation:

Degree of ring-opening reaction (%) = (A-B) − (C-D)/A − B × 100 wherein A is a total acid value of the product before ring-opening reaction, B is a half acid value of the product before ring-opening reaction, C is a total acid value of the product after ring-opening reaction and D is a half acid value of the product after ring-opening reaction, the total acid value and half acid value being determined by the method disclosed in appended examples.

The ring-opening reaction can be carried out using water, alcohol or amine, as in conventional manner. For example, the reaction product is heated with water at 50° to 160°C to effect a ring-opening reaction. In this reaction water is usually employed in an amount of 0.8 to 4 moles per acid anhydride ring contained in the product. To promote the reaction a tertiaryamines such as triethyl amine and the like can be used as a catalyst. With an alcohol the ring-opening reaction is carried out at 50° to 160°C, using 0.8 to 2.0 moles of alcohol per acid anhydride ring contained in the product. Employable alcohols are, for example, (1) primary or secondary monohydric alcohols having not more than eight carbon atoms, such as methyl alcohol, ethyl alcohol, n-propyl alcohol, n-butyl alcohol, octyl alcohol, benzyl alcohol, cyclohexyl alcohol, ethyleneglycol mono-alkyl ether, etc.; and (2) di-, tri and tetra-hydric alcohols, such as ethylene glycol, propylene glycol, neopentyl glycol, glycerin, trimethylol propane, trimethylol ethane, pentaerythritol, etc. Penta- or more poly-hydric alcohols may also be used when monohydric alcohols are employed in combination therewith so as to adjust average functionality of the mixture to not more than 4. When secondary alcohols are used, it is preferable to employ tertiary amines as a catalyst. The ringopening reaction can also be carried out using amines at 20° to 120°C. The amines are used in an amount of 0.6 to 1.2 moles per acid anhydride ring contained in the product. Examples of the amines to be used are diethyl amines and like primary or secondary alkyl amines having not more than 8 carbon atoms, monoethanol amine and like alkanol amines having not more than 8 carbon atoms, aniline, toluidine and like aromatic amines, cyclohexylamine and like alicyclic amines, etc.

Organic solvents may be added to the modified butadiene polymer obtained as above. Such organic solvents are those not adversely affecting water dispersibility of the final product and electrodeposition characteristics thereof. Examples of such solvents are ethyl alcohol, isopropyl alcohol, secondary butyl alcohol and like monohydric alkanols having not more than five carbon atoms, ethylene glycol, monoethyl ether and like ethyleneglycol monoalkyl ethers, methylethyl ketone, diisobutyl ketone and like dialkyl ketones, ethyl acetate, butyl acetate and like esters of aliphatic monocarboxylic acids of not more than three carbon atoms and aliphatic alcohols of not more than four carbon atoms, diacetone alcohol, diacetone alcohol methyl ether, etc. Such solvents are used singly or in admixture with one another in an amount of not more than 50 weight parts, based on 100 weight parts of the modified butadiene polymer.

Neutralization reaction of the modified butadiene polymer can be conducted before or after it is mixed with a methylolated phenol resin. However, it is preferable in the invention to carry out the neutralization reaction after the methylolated phenol resin is mixed with the modified butadiene polymer, since the water-dispersibility of the methylolated phenol resin is thereby markedly improved as compared with the case in which methylolated phenol resin is mixed with the modified butadiene polymer previously neutralized. In fact, when the modified butadiene polymer is neutralized before mixture with monomethylolated phenol resin, it can effectively be supplied to an electrodeposition bath by a neutralized paint feed system disclosed in, for example, British Pat. No. 1,106,979, in which the neutralized product and methylolated phenol resin is supplied thereto simultaneously or successively, but it can not be supplied effectively to the bath by an acidic paint feed system disclosed in, for example, British Pat. No. 1,030,204, in which the modified butadiene polymer to be supplied is neutralized in the bath and thereafter methylolated phenol resin is supplied thereto, since the electrodeposition coating film lacks smoothness due to poor water-dispersibility of the methylolated phenol resin. Conversely, when the modified butadiene polymer is neutralized after mixture with methylolated phenol resin, it can be effectively supplied to the bath not only by neutralized paint feed system but also by acidic paint feed system.

The methylolated phenol resins to be used in the invention are water-dispersible resol-type phenol resin containing 1 to 3 phenol nuclei and at least one methylol group in the molecule, which is prepared by reacting phenol, m-cresol, resorcinol, p-cresol, p-tert-butyl phenol, p-tert-amyl phenol, bisphenol-A or like phenols with formaldehyde in the presence of an alkali catalyst.

Such methylolated phenol resin is used in an amount of 3 to 50 weight parts, preferably 5 to 30 weight parts, based on 100 weight parts of the modified butadiene polymer.

The neutralization reaction is carried out using a base such as ammonia, organic amines, alkali metal hydroxides, etc. Examples of amines are monomethanol amine, diethanol amine, triethanol amine and like alkanol amines, monoethyl amine, diethylamine, triethyl amine, diisopropyl amine, trimethyl amine, diisopropyl amine and like alkyl amines having not more than four carbon atoms, dimethylaminoethanol and like alkyl alkanol amines, and cyclohexyl amine and like alicyclic amines. Examples of alkali metal hydroxides are sodium hydroxide, potassium hydroxide, etc. The neutralization reaction is carried out by conventional method, for example, by adding aqueous solution of a base to the modified butadiene polymer at a temperature lower than 100°C to produce aqueous dispersion of the neutralized product of the modified butadiene polymer. The amount of the base to be used is such that the resultant aqueous dispersion has a pH of 6.0 to 9.0.

As disclosed before, the present composition is prepared by neutralizing the modified butadiene polymer with the base and then mixing the aqueous dispersion of the neutralized product with the methylolated phenol resin, or by mixing the modified butadiene polymer with the methylolated phenol resin and then neutralizing the mixture with the base. In the former method the neutralization process is carried out before the present composition is supplied to a bath. But in the latter method the mixture of modified butadiene polymer and methylolated phenol resin may be directly supplied to an electro-deposition bath, followed by neutralization with the base in the bath, or may be supplied thereto after neutralized with the base.

To the present composition, pigments and like additivies can be added, if required, after or before neutralization.

For a better understanding of the invention examples are given below, in which all parts and percentages are by weight.

Example 1

Into a reactor equipped with an agitator, thermometer, reflux condenser and nitrogen gas injector were placed 40 parts of 1,2-polybutadiene (90 percent of vinyl double bond, number average molecular weight of about 1,100, iodine value of 427), 20 parts of 1,4-polybutadiene (76 percent of cis 1,4-bond, 23 percent, of trans 1,4-bond and 1% of vinyl double bond; number average molecular weight of about 1,400; iodine value of 454), 25 parts of linseed oil, 15 parts of maleic anhydride, 0.1 part of butylated hydroxytoluene and 1 part of toluene. The mixture was reacted at 190°C for about 4 hours in a nitrogen gas atmosphere, whereby 99 percent of maleic anhydride was reacted. The reaction product had a total acid value of 140 and half acid value of 75. To the reaction system which was adjusted to a temperature of 90°C, were added 5.5 parts of water and 0.1 part of triethylamine, followed by reaction at 100°C for 2 hours to subject the acid anhydride ring to ring-opening. The reaction product gave a total acid value of 130 and half acid value of 110. The ring-opening was effected to a rate of 69 percent. The resultant product is hereinafter referred to as "product A."

After the ring-opening reaction, 20 parts of ethylene glycol monoethyl ether was added to the product A and the mixture was adjusted to 60°C, followed by addition thereto of 20 parts of 70 percent aqueous solution of monomethylolated phenol resin (trademark: "WP-71," produced by Gun-ei Kagaku Kogyo Kabushiki Kaisha, Japan). The mixture was dissolved at the same temperature over a period of 1 hour and then cooled to room temperature to obtain a resin solution. To 20 parts of the resin solution thus prepared were added 10 parts of isopropyl alcohol and pigments in such amounts as required for the pigment composition given below. The resulting mixture was grinded in a ball mill for 20 hours to disperse the pigments and thereafter added to the remainder of the resin solution and mixed therewith.

Pigment Composition

| | | |
|---|---|---|
| Resin solution (in solid weight) | 100 | parts |
| Rutil-type titanium white | 25 | parts |
| Carbon black | 0.5 | part |
| Strontium chromate | 0.4 | part |

The composition was then neutralized and dispersed in water with diethanolamine and distilled water to prepare a neutralized aqueous dispersion of a solid concentration of 40 percent such that when diluted to a solid concentration of 10 percent it will have a pH of 8.2.

Three quarters of the neutralized aqueous dispersion was then diluted with distilled water to a solid concentration of 10 percent to prepare an electro-deposition bath (pH 8.2). The remainder of the neutralized aqueous dispersion, i.e., a quarter of the original amount thereof, was slowly added to the electrodeposition bath with stirring but without dilution with water. The resulting bath was then adjusted with distilled water to a solid concentration of 10 percent. The ingredients of the electrodeposition bath (pH 8.2) thus obtained were found to be dispersed therein uniformly.

Example 2

Into a reactor the same as used in Example 1 were placed 45 parts of 1,2-addition polybutadiene dicarboxylic acid (85 percent of vinyl bond, number average molecular weight of about 1,500, acid value of 60, iodine value of 410), 15 parts of 1,4-addition polybutadiene (80 percent of cis 1,4-bond, 17 percent of trans 1,4-bond and 3 percent of vinyl bond; number average molecular weight of about 2,000; iodine value of 444), 30 parts of esterified product prepared by reacting 71 parts of linseed oil fatty acid, 14.5 parts of Epikote 828 (Trademark, epoxy resin produced by Shell Chemical Corp.) and 14.5 parts of Epikote 1001 (same as aboe), 10 parts of maleic anhydride and 1 part of xylene. The mixture was reacted at 200°C for 3 hours in a nitrogen gas stream, whereby 99 percent of maleic anhydride was reacted. The reaction product had a total acid value of 120 and half acid value of 80. To the reaction system, then adjusted to a temperature of 90°C, was added 7.5 parts of propylene glycol, followed by reaction at the same temperature for 1 hour to subject the acid anhydride ring to ring-opening. The resulting product (hereinafter referred to as "product B") had a total acid value of 90 and half acid value of 75. The ring-opening of the acid anhydride ring was effected to a rate of 62 percent. After the ring-opening reaction, 30 parts of isopropyl alcohol was added to the product and the mixture was adjusted to 60°C, followed by addition thereto of 14 parts of 70 percent aqueous solution of monomethylolated p-tert-butylphenol resin (resol resin). The resulting mixture was then dissolved at the same temperature over a period of 2 hours and then cooled to room temperature to obtain a resin solution, in which were dispersed pigments in the same manner as in Example 1.

Three quarters of the pigmented dispersion thus prepared was then diluted with triethylamine and distilled water to a solid concentration of 10 percent to prepare an electrodeposition bath having pH of 8.6. The remainder of the dispersion, a quarter of the original amount thereof, was slowly added to the electrodeposition bath with stirring but without neutralization. The mixture was kept at 30°C for 15 minutes to effect uniform dispersion at pH of 7.4. Triethylamine and distilled water were added to the dispersion to adjust the resulting electrodeposition bath to pH of 8.0 and solid concentration of 10 percent. The ingredients of the electrodeposition bath thus obtained were found to be dispersed therein uniformly.

Example 3

Into a reactor the same as used in Example 1 were placed 30 parts of 1,2-addition polybutadiene (80 percent of vinyl bond, number average molecular weight of about 2,500, iodine value of 410), 25 parts of 1,4-addition polybutadiene (45 percent of cis 1,4-bond, 54 percent of trans 1,4-bond and 1 percent of vinyl bond; number average molecular weight of about 900; iodine value of 432), 10 parts of soybean oil, 18 parts of liquid petroleum resin (comprising butadiene and isobutylene in a molar ratio of 40:60, number average molecular weight of about 700, iodine value of 160) and 17 parts of maleic anhydride. The mixture was reacted at 220°C for 2 hours in a nitrogen gas stream, whereby 98 percent of maleic anhydride was reacted. The reaction product had a total acid value of 155 and half acid value of 90. To the reaction system, then adjusted to a temperature of 120°C, was added 12.5 parts of benzyl alcohol, followed by reaction at 130°C for 2 hours to subject the acid anhydride ring to ring-opening. The resulting product had a total acid value of 95 and half acid value of 85. The ring-opening of the acid anhydride ring was effected to a rate of 84 percent. After the ring-opening reaction, 15 parts of sec-butanol was added to the product and the mixture was adjusted to 80°C, followed by addition thereto of 10 parts of 70 percent solution of dimethylolated disphenol A in ethylene glycol monoethyl ether. The resulting mixture was then dissolved at the same temperature over a period of 40 minutes and then cooled to room temperature to obtain a resin solution, in which were dispersed pigments in the same manner as in Example 1. Using 40 percent aqueous solution of potassium hydroxide and distilled water, the desired electrodeposition coating composition of this invention was obtained which had pH of 8.4 solid content of 10 percent.

Example 4

To a solution of 100 parts of the product A prepared in Example 1 in 20 parts of ethylene glycol monoethyl ether was added an aqueous solution of diethyl amine to produce a neutralized aqueous dispersion which has a solid concentration of 35 weight percent and a pH of 8.3 when diluted to a solid concentration of 10 weight percent. Then 20 parts of 70 percent aqueous solution of monomethylolated phenol resin the same as in Example 1 was added to the dispersion. To a quarter of the mixture were added pigments in the same amount as in Example 1. The resulting mixture was grinded in a ball mill for 20 hours and thereafter added to the remainder and mixed therewith. The pigmented aqueous dispersion was diluted with distilled water to a solid concentration of 10 percent to prepare an electrodeposition bath (pH 8.2). The reaction rate of the dibasic acid and total acid value and half acid value in the foregoing and appended examples were calculated in the following manner.

1. Reaction rate (percent by weight) of α,β-unsaturated dibasic acid = (Amount of dibasic acid used) − (Amount of dibasic acid unreacted)/(Amount of dibasic acid used) × 100

2. Total acid value

About 0.2 g of sample was placed in an Erlenmeyer flask and the weight of the sample was accurately measured. About 30 cc of a mixture of pyridine and distilled water in the weight ratio of 10:1 was added to the sample. The resulting mixture was mildly boiled for about 2 minutes on a sand bath and then cooled to room temperature, followed by addition of phenolphthalein and titration with 1/10 N solution of KOH in ethyl alcohol. A color change was the end point of titration.

Total acid value = Amount (cc) of 1/10 N KOH-EtOH solution added × $f$ × 5.61/Amount of sample used (in solid)(g)

wherein $f$ is a factor of 1/10 N KOH-ethyl alcohol solution

3. Half acid value

About 0.2 g of sample was placed in an Erlenmeyer flask and the weight of the sample was accurately measured. About 30 cc of a mixture of ethyl alcohol and toluene in the weight ratio of 1:1 was added to the sample. The resulting mixture was mildly boiled for about 2 minutes on a sand bath and then cooled to room temperature, followed by titration with 1/10 N solution of KOH in ethyl alcohol. The amount of the solution added was measured at the end point of titration, i.e., when a change of color took place.

Half acid value = Amount (cc) of 1/10 N KOH-EtOH solution added × $f$ × 5.61/Amount of sample used (in solid)(g)

wherein $f$ is a factor 1/10 N KOH-ethyl alcohol solution

Comparison Example 1

Into a reactor the same as used in Example 1 were placed 100 parts of 1,2-polybutadiene (number average molecular weight of about 1450, 91 percent of 1,2-bond and 9 percent of trans 1,4-bond, iodine value of 425), 100 parts of maleic anhydride and 100 parts of xylene. The mixture was reacted at 150°C for 15 hours under reflux of solvent, and, thereafter the solvent was distilled off at a reduced pressure at 100°C. The reaction rate of the maleic acid was 8 percent. To the maleinized product were added 5.5 parts of distilled water and 0.1 part of triethylamine, and the mixture was reacted at 100°C for 1 hour. To the resulting reaction mixture was added 150 parts of distilled water, followed by vigorous stirring by the agitator for 30 minutes. The mixture was left to stand for 3 hours for separation into phases. The aqueous phase was discarded to remove unreacted maleic anhydride. This procedure for removing the unreacted maleic anhydride was repeated three times to reduce the amount of unreacted maleic anhydride in the reaction product to 0.25 percent. The resulting reaction product was dried at 80°C for 10 hours at a reduced pressure. To the dried product was then added 23 parts of ethylene glycol monoethyl ether to dissolve the product to prepare a solution containing 83 percent of resin solid, which had a total acid value of 80 and half acid value of 75.

To 100 parts (in solid weight) of this solution was added 20 parts of 70 percent aqueous solution of monomethylolated phenol resin (the same as in Example 1) to obtain a resin solution, in which were dispersed pigments in the same manner as in Example 1. The dispersion was diluted with triethylamine and distilled water to pH of 7.8 and solid concentration of 10 percent.

Comparison Example 2

In solution of 100 parts of the product A prepared in Example 1 in 20 parts of ethylene glycol monoethyl ether were dispersed pigments in the same manner as in Example 1. The dispersion was then neutralized and diluted with triethylamine and distilled water to pH of 8.3 and solid concentration of 10 percent, whereby an electrodeposition coating composition was prepared.

Comparison Example 3

In the reactor the same as in Example 1 were placed 70 parts of 1,4-polybutadiene the same as used in Example 1, 30 parts of linseed oil having an iodine value of 181 and 15 parts of maleic anhydride, and the mixture was reacted at 200°C for 3 hours in a nitrogen gas stream. The reaction rate of maleic anhydride was 99 percent. To the resultant maleinized product was added 11 parts of propylene glycol and the mixture was reacted at 120°C for 2 hours, whereby the product having total acid value of 75 and half acid value of 65 was obtained. The product was then dissolved in 20 parts of ethylene glycol monoethyl ether. To the solution were added 8 parts of triethyl amine and 9.1 parts of distilled water and stirred at 30°C for 30 minutes, whereby an aqueous dispersion having a solid concentration of 40 weight percent and a pH of 7.5 when diluted to a solid concentration of 10 percent was obtained.

To 100 parts (in solid weight) of the dispersion was added 20 parts of 70 percent aqueous solution of monomethylolated phenol resin the same as in Example 1, and pigments were dispersed therein in the same manner as in Example 4. The pigmented dispersion was diluted with distilled water to produce an electrodeposition bath of pH of 7.4 and solid concentration of 10 percent.

The electrodeposition coating compositions obtained in Examples 1 to 4 and Comparison Examples 1 to 3 were tested to determine various properties thereof, with the results given in the following Table 1.

Table 1

|  | Ex. 1 | Ex. 2 | Ex. 3 | Ex. 4 | Com. Ex. 1 | Com. Ex. 2 | Com. Ex. 3 |
| --- | --- | --- | --- | --- | --- | --- | --- |
| pH (25°C) | 8.2 | 8.0 | 8.4 | 8.2 | 7.8 | 8.3 | 7.4 |
| Specific conductivity ($\mu\Omega$/cm) | 1855 | 1990 | 4885 | 1950 | 1030 | 2015 | 2200 |
| Throwing power (cm) | 17.0 | 18.5 | 16.5 | 17.6 | 11.0 | 15.0 | 10.5 |
| Thickness of film ($\mu$) | 26 | 24 | 25 | 24 | 23 | 27 | 24 |
| State of film surface | A | A | A | A | B | C | B |
| Gel fraction (%) | 96 | 97 | 94 | 93 | 65 | 78 | 72 |
| Corrosion resistance (hrs) |  |  |  |  |  |  |  |
| Untreated steel plate | At least 240 | At least 240 | At least 240 | More than 240 | 96 | 72 | 48 |
| Iron phosphate-treated steel plate | do. | do. | do. | do. | 120 | 96 | 72 |
| Evaluation of top coat surface |  |  |  |  |  |  |  |
| Gloss | 93 | 92 | 93 | 95 | 54 | 65 | 58 |
| Luster | A | A | A | A | C | C | C |
| Stability of electrodeposition bath |  |  |  |  |  |  |  |
| Change in film thickness ($\mu$) | +1 | −2 | −2 | −2 | −2 | −5 | +5 |
| State of film surface | A | A | A | A | B | C | B |

The conditions for electrodeposition coating and methods of tests given in the table are as follows:

(1) Conditions for electrodeposition coating
- Temperature of electrodeposition bath: 30°C
- Ratio of electrode areas: 1:1
- Coating area: 20 cm × 20 cm
- Distance between electrodes: 15 cm
- Time of current application: 3.0 minutes
- Wave form: 3-phase full-wave rectification (2) Test Methods

Throwing power

Usual device for measuring throwing power was used which comprises a stainless steel pipe having an inner diameter of 16 mm, and an inner measuring plate to be inserted in the pipe and an outer plate for measuring a film thickness. Current was applied at such voltage as to form an electrodeposited film on the outer measuring plate to a thickness of 25 ± 2 $\mu$ for 3 minutes, and the length from the bottom up to the top of the electrodeposited portion of the inner plate was measured. Thus, the greater the value listed in the table, the higher is throwing power.

State of film surface

A steel plate treated with iron phosphate (plate to be coated) and another plate of mild steel (opposite electrode) of the same size were spaced apart by 15 cm in the bath sample, and electrodeposition coating was conducted by passing current for 3 minutes at such voltage as to form a deposited film to a thickness of 25 ± 2 $\mu$. The coated plate was then taken out of the bath, washed with tap water, baked at 170°C for 20 minutes, whereby a test plate was prepared. The test plate was checked for smoothness of the film surface and occurrence of cissing and pitting. The results given in the table are expressed by A which represents excellent smoothness free of any cissing and pitting, by B which represents slightly impaired smoothness with occurrence of some cissing and pitting and by C which represents seriously deteriorated smoothness and occurrence of considerable cissing and pitting.

Gel fraction

Gel fraction was measured for the purpose of determination of curability of the deposited film. Test plate was prepared by conducting electrodeposition coating in the same manner as in the evaluation of state of film surface, except that a tinplate was used as an article to be coated. The deposited film was peeled off the plate and immersed in acetone to extract acetone-soluble content under the boiling point of acetone. The resulting residue was then dried at a reduced pressure. Gel fraction was calculated from the result according to the following equation.

Gel fraction (%) = Weight (g) of film after extraction in acetone/Weight (g) of film prior to extraction in acetone × 100

Accordingly, the greater the gel fraction value, the higher will be the curability of the film.

Corrosion resistance

Test plate was prepared by conducting electrodeposition in the same manner as in the evaluation of state of film surface. Two kinds of plate were used, i.e., untreated steel plate and steel plate treated with iron phosphate. Diagonal cut lines were formed in the deposited film on the test plate to such an extent as to reach the base plate. The test plate was then subjected to brine spray test at a temperature of 35°C and a humidity of 100 percent using 5 percent aqueous solution of common salt. The result is expressed in terms of time taken for rust to develop over a distance of 3 mm from the cut lines.

Evaluation of top coat surface

Test plate was prepared by using a satin-finished steel plate, treated with iron phosphate and having surface roughness of 5 to 6 $\mu$, and subjecting the steel plate to the same procedure as in the evaluation of state of film surface. The test plate was then coated with an aminoalkyd resin coating composition to such thickness that the resulting top coat will be 35 ± 2 $\mu$ in thickness when dried. The coated test plate was subsequently left to stand for 15 minutes and thereafter baked at 140°C for 30 minutes. The gloss of the coating was evaluated in terms of 60° specular reflection coefficient. The luster was evaluated in terms of ability to form the image of an object on the coating, as determined through inspection with the unaided eye. Thus, test plate which gave a very clear image is represented by A, one giving an indistinct image by B and one giving a very indistinct image by C.

Stability of electrodeposition bath 3 liters of each sample was placed in a cylindrical stainless steel container having a diameter of 25 cm, and the sample was stirred at 30°C for 40 days with the lid of the container left open. The reduction due to evaporation during stirring was made up for with distilled water. The resulting sample was used as a reserved sample. Each of the samples obtained immediately after preparation according to Examples 1 to 4 and Comparison Examples 1 to 3 was subjected to electrodeposition at such voltage level as to give a film having a thickness of 25 ± 2 μ, under the same conditions as in the evaluation of state of film surface. The reserved sample was also subjected to electrodeposition at the same voltage as above. Change in the thickness of electrodeposited film was determined as follows:

Change in film thickness = A - B wherein A is the thickness of electrodeposited film of the sample immediately after preparation and B is the thickness of electrodeposited film of the reserved sample.

To evaluate the state of film surface, the reserved sample was subjected to electrodeposition, cured by baking at 170°C for 20 minutes and inspected for the smoothness of film surface and occurrence of cissing and pitting therein. The results are represented by the same symbols as used in the foregoing evaluation of state of film surface.

What we claim is:

1. An electrophoretic coating composition which comprises a resinous binder dispersed in an aqueous medium; said resinous binder being a mixture of a modified butadiene polymer neutralized with a base and a methylolated phenol resin which is water-dispersible resole type phenol resin containing 1 to 3 phenol nuclei and at least one methyol group in an amount of 3 to 50 weight parts based on 100 weight parts of modified butadiene polymer; said modified butadiene polymer being the reaction product of a starting mixture of 1,2-polybutadiene, 1,4-polybutadiene in a weight ratio of 3 to 9 : 7 to 1 and unsaturated oil compound having an iodine value of at least 100 in an amount of 10 to 60 weight percent based on the total weight of the polybutadiene mixture and the unsaturated oil compound with at least one $\alpha,\beta$-unsaturated dicarboxylic acid and anhydrides thereof selected from the group consisting of maleic acid, maleic anhydride, fumaric acid, itaconic acid and itaconic anhydride, in an amount of 7 to 40 weight parts based on 100 parts of the starting mixture; said 1,2-polybutadiene containing at least 70 percent of vinyl bond and having a number average molecular weight of 500 to 5,000 and an iodine value of at least 350; said 1,4-polybutadiene containing at least 90 percent of 1,4-bond and having a number average molecular weight of 500 to 10,000 and an iodine value of at least 400; said unsaturated oil compound being at least one species selected from the group consisting of (1) a natural oil, (2) a natural oil fatty acid, (3) an ester of a natural oil fatty acid with a polyhydric alcohol having 2 to 6 hydroxyl groups in the molecule, (4) an ester of a natural oil fatty acid with an epoxy resin having a number average molecular weight of 200 to 2,000, (5) an ester of a natural oil fatty acid with a polyol resin having a number average molecular weight of 200 to 2,000, (6) a modified oil prepared by treating the above oil (1) thermally or chemically and (7) a dimer of natural oil fatty acid.

2. The electrophoretic coating composition according to claim 1, in which said 1,2-polybutadiene contains at least 80 percent of vinyl bond and has a number average molecular weight of 1,000 to 3,000 and an iodine value of at least 400.

3. The electrophoretic coating composition according to claim 1, in which said 1,4-polybutadiene contains at least 90 percent of 1,4-bond and has a number average molecular weight of 1,000 to 5,000 and an iodine value of at least 450.

4. The electrophoretic coating composition according to claim 1, in which said unsaturated oil compound has an iodine value of 120 to 200.

5. The electrophoretic coating composition according to claim 1, in which said natural oil is at least one species selected from the group consisting of linseed oil, soybean oil, dehydrated castor oil, tung oil, safflower oil, cotton seed oil, tall oil, fish oil and whale oil.

6. The electrophoretic coating composition according to claim 5, in which said natural oil is at least one species selected from the group consisting of linseed oil, dehydrated castor oil and soybean oil.

7. The electrophoretic coating composition according to claim 1, in which said fatty acid of the natural oil is at least one species selected from the group consisting of linseed oil fatty acid, soybean oil fatty acid, dehydrated castor oil fatty acid and tung oil fatty acid.

8. The electrophoretic coating composition according to claim 1, in which said ester of a natural oil fatty acid with an epoxy resin is an ester of a natural oil fatty acid with an epoxy resin having a number average molecular weight of 200 to 2,000 and produced by the reaction of bisphenol A with epichlorohydrine.

9. The electrophoretic coating composition according to claim 1, in which said amount of the unsaturated oil compound is in the range of 30 to 50 weight percent.

10. The electrophoretic coating composition according to claim 1, in which said unsaturated oil compound is used in a mixture with at least one of a petroleum resin having an iodine value of less than 300 and a number average molecular weight of 200 to 2,000, rosin and cumarone resin.

11. The electrophoretic coating composition according to claim 1, in which at least one of said $\alpha,\beta$-unsaturated dibasic acid and anhydride thereof is used in an amount of 10 to 25 weight parts based on 100 weight parts of the starting mixture.

* * * * *